Figure 1:
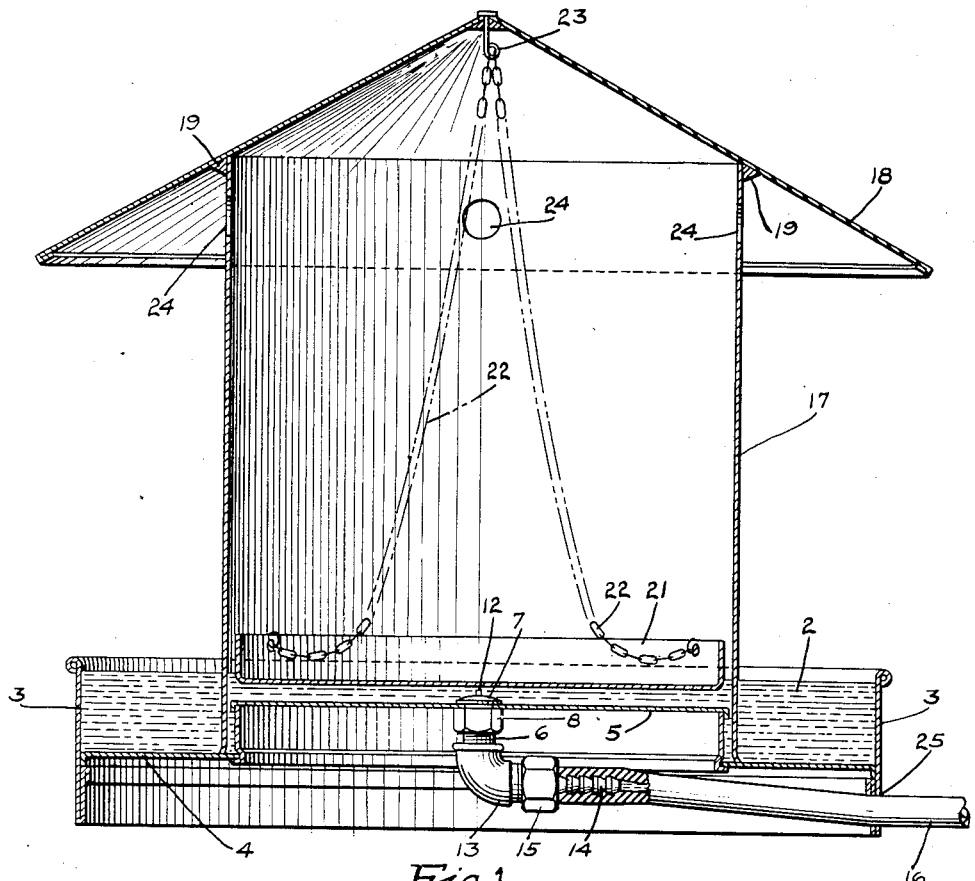

Nov. 7, 1933.   R. FITZLOFF   1,933,723

POULTRY WATERER

Filed Dec. 7, 1931

INVENTOR
RAY FITZLOFF
By Paul, Paul & Moore
ATTORNEYS

Patented Nov. 7, 1933

1,933,723

UNITED STATES PATENT OFFICE 1,933,723

POULTRY WATERER

Ray Fitzloff, St. Clair, Minn.

Application December 7, 1931. Serial No. 579,495

5 Claims. (Cl. 119—80)

This invention relates to new and useful improvements in poultry waterers and particularly to such a device of the portable type.

An object of the invention is to provide a poultry waterer comprising a receptacle having a normally closed valve mounted in the bottom thereof and provided with means for connecting it with a fluid supply, said valve having a stem protruding from the casing thereof and adapted to be engaged by a float whereby, when the fluid in the receptacle drops to a predetermined level, the float will engage the valve stem and open the valve to replenish the fluid in the receptacle.

A further object is to provide a poultry waterer comprising a receptacle having a bottom wall provided with a raised portion which preferably is cylindrical in configuration and said raised portion having a normally closed valve mounted therein which valve is provided with a protruding stem adapted to be engaged by a float, when the water in the receptacle drops to a predetermined level, and a housing being supported in said receptacle and adapted to enclose the valve and float.

A further object is to provide a device of the class described comprising a receptacle provided with a bottom having a raised portion, and a threaded nipple being secured in the upper wall of said raised portion and providing a casing for a normally closed valve, which valve has a stem projecting from the end of said casing, and a housing being supported on the bottom of the receptacle and enclosing said raised portion and provided at its upper end with a hood of ample size to provide a roof over the receptacle, and said housing having a float adapted to engage said valve stem and open the valve, whereby the water in said receptacle may be maintained at a constant level, it being understood that the valve is connected with a water supply, and means being provided within the housing for inseparably connecting the float thereto, so that when the hood and housing are removed as a unit from the receptacle, the float will be removed therewith.

A further object is to provide a simple and inexpensive poultry waterer so constructed that it may be readily and quickly cleaned whereby it may be maintained in a sanitary condition, which is important in devices of this kind, because it minimizes the danger of disease, and said waterer being provided with a valve adapted to be connected to a water supply and having means for automatically controlling the supply of water to the waterer.

Other objects of the invention will appear from the following description and accompanying drawing and will be pointed out in the annexed claims.

In the accompanying drawing, there has been disclosed a structure designed to carry out the various objects of the invention, but it is to be understood that the invention is not confined to the exact features shown as various changes may be made within the scope of the claims which follow.

Figure 2:
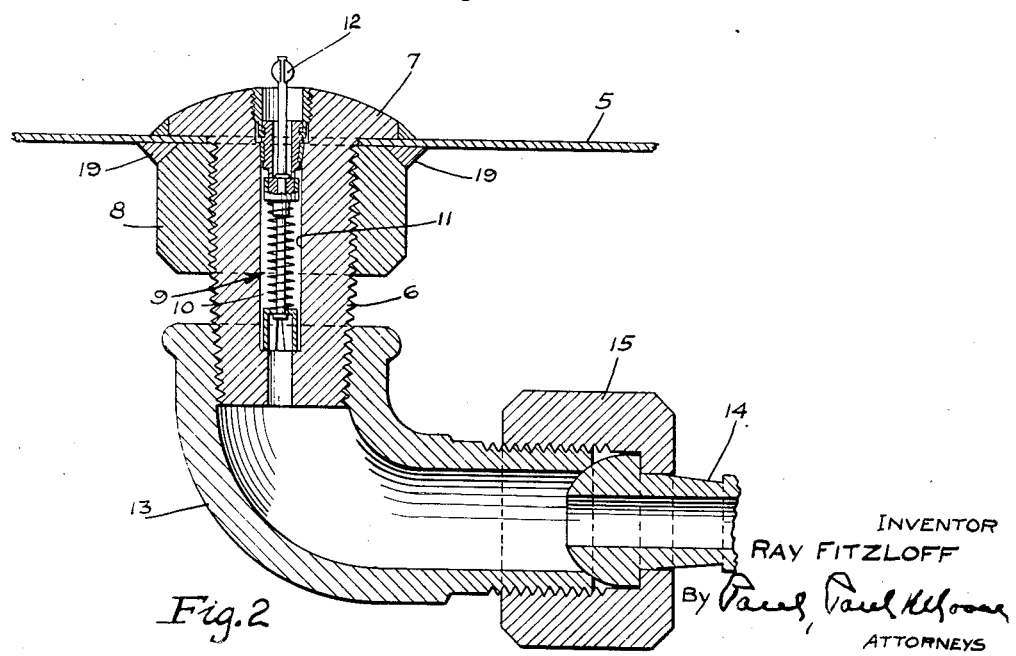

In the drawing:

Figure 1 is a vertical sectional view showing the general construction of my improved poultry waterer; and Figure 2 is an enlarged detail sectional view showing the construction of the valve provided in the bottom wall of the receptacle.

The novel poultry waterer disclosed in this invention comprises a suitable receptacle 2 having an outer wall 3 and a bottom wall 4, suitably secured to the wall 3 in spaced relation from the bottom thereof. The bottom wall 4 has a raised portion 5, in the upper wall of which is mounted a suitable valve casing 6, in the form of a nipple. Said nipple has a head 7 seated against the upper surface of the raised wall portion 5. A suitable nut 8 is received in threaded engagement with the nipple 6 and firmly secures it to the raised wall portion 5, as will readily be understood by reference to Figure 2. A suitable valve 9 such, for example, as the type commonly used in connection with pneumatic tires, is mounted within a central bore 11 provided in the nipple 6 and has a stem 12 projecting above the upper end of the valve casing 6, as shown. The valve 9 is provided with the usual spring 10 for retaining it in closed position.

A suitable elbow 13 is shown received in threaded engagement with the lower end of the nipple 6 and has a coupling member 14 detachably secured to the opposite end thereof by a nut 15. The coupling member 14 provides means for attaching a suitable supply hose 16 to the elbow 13. The opposite end of the hose 16 may be connected to a suitable source of water supply such, for example, as a water wagon, tank, or city water pressure.

A suitable housing 17 has its lower end shaped to fit over the raised portion 5, as shown in Figure 1, and has secured to its upper end a hood 18 which provides a roof for the receptacle 2. The hood 18 may be secured to the upper end of the housing 17 by suitable means such as soldering, indicated by the numeral 19.

A suitable float 21, here shown formed of sheet metal, is provided within the housing 17 and is adapted to engage the upper end of the valve stem 12 when the water in the receptacle 2 drops to a predetermined level, whereby the weight of the float will depress the valve stem and open the valve 9 to permit additional water to flow into the housing and thus restore the level of the water in the receptacle to its normal height.

To prevent the float from accidentally becoming detached or separated from the housing, suitable chains or flexible elements 22 are provided within the housing 17 and have their upper ends pendently supported from an eye-bolt 23 secured to the hood 18. The lower ends of the elements 22 are suitably secured to the upturned flange of the float 21. By thus connecting the float to the housing, the float is permitted to move freely within the housing to control the opening of the valve, when the level of the water in the receptacle drops and, at the same time, when the housing is removed from the receptacle, as when it is desired to clean the apparatus, the float will be removed therewith as a unit and will always be in proper position within the housing to engage the valve stem when the housing is positioned in the receptacle, and the water level is below normal.

Suitable apertures 24 may be provided in the upper portion of the housing 17 to permit free circulation of air in and out of the housing, when the latter is seated in the receptacle as shown in Figure 1. By thus permitting free circulation of air in and out of the upper end of the housing, the water level within the housing may readily vary within certain limits, controlled by the action of the valve 9. It is also to be understood that the connection between the lower edge of the housing and the bottom wall 4 of the receptacle 3 is such as to permit free circulation of water therebeneath so that the level of the water in the outer portion of the receptacle will be the same as the level of the water within the housing.

In the drawing, I have shown the receptacle and housing as being cylindrical in cross section, but it is to be understood that these parts may be made square, rectangular, or any other desired shape without departing from the scope of the invention.

The bottom wall 4 of the receptacle is spaced from the lower edge of the outer wall 3 thereof so as to provide clearance for the hose 16 beneath the bottom of the receptacle, as shown in Figure 1. A suitable aperture 25 is provided in the lower portion of the wall 3 beneath the bottom 4, through which a hose may pass, as shown.

The novel poultry waterer herein disclosed has been found very practical and useful on large poultry or turkey farms where numerous such devices are employed. Because of the flexible hose 16, several poultry waterers may be connected with a single supply pipe, and when it is found necessary to clean the device, the housing is removed from the receptacle, whereupon the basin may be emptied of its contents without having to disconnect it from its source of water supply and, when thoroughly cleaned, it is returned to its normal upright position and the housing replaced thereon. When the housing is thus replaced within the receptacle, the float will automatically engage the valve stem 12 whereupon the valve will be held in open position until the level of the water in the receptacle reaches a predetermined height, which will cause the float to be lifted from the valve stem.

The type of valve employed is very simple and inexpensive, and is very sensitive to the operation of the float so that upon the slightest variation of the level of the water within the receptacle, the valve will be actuated to supply fresh water thereto. The valve may also be readily removed from the valve casing 6, by unscrewing it therefrom in the same manner as an ordinary valve core is removed from an ordinary tire valve, thereby providing such an apparatus which requires very little attention when in operation, and which is very inexpensive and simple in construction.

I claim as my invention:

1. In a device of the class described, a receptacle comprising outer, inner and bottom walls cooperating to provide an annular basin having a valve casing supported on one of said walls and having a normally closed valve therein, said valve casing communicating with a liquid supply, said valve having a stem protruding from said valve casing, a housing enclosing said valve stem, and a float within said housing adapted to engage and actuate said stem to open the valve, when the liquid in the receptacle drops to a predetermined level.

2. In a device of the class described, a receptacle, a normally closed valve comprising a casing secured to a wall of said receptacle and communicating with a fluid supply, said valve casing having a valve stem projecting therefrom, a housing enclosing said valve, a float within said housing adapted to engage and actuate said stem to open the valve, when the fluid in the receptacle drops to a predetermined level, and flexible means inseparably connecting said flow with the housing whereby, when the housing is detached from the receptacle, the float will simultaneously be removed therewith.

3. A poultry waterer comprising a receptacle having an outer circular wall, a bottom wall secured to said outer wall and spaced from the lower edge thereof, said bottom wall having a centrally disposed raised portion of circular configuration, a cylindrical housing detachably fitting over said raised portion and having a cone-shaped hood whose outer edge overhangs the outer wall of the receptacle to provide, in effect, a roof therefor, means for delivering water to said receptacle, and a float-operated valve for automatically maintaining the water in the receptacle at a constant level.

4. In a device of the class described, a receptacle comprising outer, inner and bottom walls a valve casing supported on one of said walls and having a normally closed valve therein, said valve casing communicating with a liquid supply, said valve having a stem whereby it may be operated, a housing enclosing the valve, and a float within said housing adapted to actuate said stem to open the valve, when the liquid in the receptacle drops to a predetermined level.

5. In a device of the class described, a receptacle comprising outer, inner and bottom walls, a valve casing supported on one of said walls and having a valve therein provided with a stem, said valve casing communicating with a supply of water, a housing enclosing the valve, and a float within the housing adapted to actuate said stem to open the valve, when the water in the receptacle drops to a predetermined level.

RAY FITZLOFF.